United States Patent [19]

Ushio et al.

[11] Patent Number: 4,882,215

[45] Date of Patent: Nov. 21, 1989

[54] PRECOATED METAL PLATE FOR HEAVY FORMING USE

[75] Inventors: Akira Ushio, Hirakata; Tomotsu Sobata, Sakai, both of Japan

[73] Assignee: Nippon Paint Co., Ltd., Osaka, Japan

[21] Appl. No.: 177,346

[22] Filed: Apr. 4, 1988

[30] Foreign Application Priority Data

Apr. 3, 1987 [JP] Japan .................................. 62-082646

[51] Int. Cl.$^4$ ............................................. C23C 22/24
[52] U.S. Cl. .................................... 428/143; 428/149; 148/251
[58] Field of Search ................. 428/143, 149; 148/251

[56] References Cited

U.S. PATENT DOCUMENTS

| | | | |
|---|---|---|---|
| 3,676,208 | 7/1972 | Griffen | 428/149 |
| 4,282,281 | 8/1981 | Ethan | 428/149 |
| 4,348,447 | 9/1982 | Miller | 428/143 |
| 4,606,963 | 8/1986 | Farrell | 428/143 |

FOREIGN PATENT DOCUMENTS

| | | | |
|---|---|---|---|
| 524091 | 4/1956 | Canada | 428/149 |
| 777777 | 2/1968 | Canada | 428/149 |

*Primary Examiner*—Sam Silverberg
*Attorney, Agent, or Firm*—Wenderoth, Lind & Ponack

[57] ABSTRACT

A precoated metal plate for heavy forming use comprising a metal plate having on its surface a coating which is prepared by applying an aqueous composition consisting essentially of a binder component (A) and hard inorganic microparticles (B) and which is 0.05 to 5 $\mu$ thickness, the binder component (A) being an aqueous resin or a combination of aqueous resin and a water-soluble chromium compound containing 30 to 90% by weight of hexavalent chromium, the microparticles having Mohs' hardness of 3 to 9 and an average grain diameter of 0.1 to 20 $\mu$, and the coating being characterized by having a percentage of horizontal sectional area of the inorganic microparticles protruded beyond the film surface of said binder component at the film surface of 5% or more. The coated metal plate is specifically useful for heavy forming purpose.

5 Claims, No Drawings

PRECOATED METAL PLATE FOR HEAVY FORMING USE

FIELD OF INVENTION

The present invention relates to a precoated metal plate to be specifically useful for heavy forming purpose.

BACKGROUND OF THE INVENTION

As a surface treatment of metal substrates as zinc plate, galvanized sheet steel, aluminium plate and the like, has been widely used a technique wherein a metal surface is merely treated with the so-called coating-type, non-rinse chromate treating agent comprising an aqueous resin and a water-soluble chromium compound, because of its easy operation and operational control and reduced number of required prosessing steps. Particularly preferred treating bath contains, as main ingredients, an emulsion obtained by the polymerization of at least one $\alpha, \beta$-ethylenically unsaturated monomer in the presence of water-soluble high molecular compound as an emulsifier, and a water-soluble chromium compound from the standpoint of attaining excellent anti-corrosion and coat adhesion properties of the formed coating.

However, in considering surface pre-treatment of a metal plate, it is of great importance to take into account, not only the stationary adhesion between the plate substrate and the composition, but also the coating adhesion under bending and processing conditions, and the scratch resistance of the coating. Generally speaking, coating adhesion under bending and scratch resistance are mutually conflicting properties, and therefore, heretofore proposed coating type, non-rinse chromate treating agents have failed to give the desired properties in full for metal plates.

Under the circumstances, the present inventors have made various proposals on the method for treating metal surfaces and compositions to be used therefor. That is, in Japanese Patent Publication No. 39393/81, was provided a method for the treatment of a metal surface which comprises applying a treating liquid comprising an emulsion and a water-soluble chromium compound containing 30 to 90% by weight of hexavalent chromium and optional water-insoluble white carbon to a metal surface and drying the resultant, said emulsion being prepared by emulsion polymerization of $\alpha, \beta$-monoethylenically unsaturated monomer in the presence of an emulsifier selected from the group consisting of a polyacrylic acid and a copolymer of acrylic acid and a monomer selected from methacrylic acid, an acrylamide, a methacrylamide and a hydrophilic monomer of the formula:

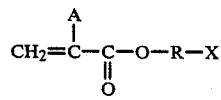

wherein A is hydrogen atom or methyl; R is a substituted or unsubstituted alkylene having 2 to 4 carbon atoms; and X is a functional group containing at least one of oxygen atom, phosphorus atom and sulfur atom.

In Japanese Patent Application Kokai No. 213064/83, was provided an anticorrosive metal surface pretreating composition comprising an emulsion of polymer particles and a water soluble chromium compound, said particles being prepared by the emulsion polymerizatin of $\alpha, \beta$-ethylenically unsaturated monomers in the presence of an emulsifier selected from the group consisting of a polyacrylic acid and a copolymer of acrylic acid and a monomer selected from methacrylic acid, an acrylamide, a methacrylamide and a hydrophilic monomer of the formula:

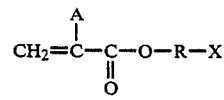

wherein A is hydrogen atom or methyl; R is a substituted or unsubstituted alkylene having 2 to 4 carbon atoms; and X is a functional group containing at least one of oxygen atom, phosphorus atom and sulfur atom, and formed as hard particles through internal gelation (or crosslinking) by the selection of monomer having two or more ethylenic unsaturations as a part of said $\alpha, \beta$-ethylenically unsaturated monomers or having a glass transition point from 15° to 110° C. by the selection of monomers used.

And, in Japanese Patent Application Kokai No. 197575/84 was provided an anticorrosive metal surface pretreating composition comprising an emulsion of polymer particles comprising at least one $\alpha, \beta$-ethylenically unsaturated monomers bearing thereon, as protective colloid, an oligomer with hydrophylic groups comprising at least one $\alpha, \beta$-ethylenically unsaturated monomers, the mean diameter of the particles being 0.1 to $3\mu$ and the particles being formed as hard microparticles through internal gelation or having a glass transition point from 15° to 110° C. and a water soluble chromium compound.

These compositions, when applied on metal plates, could give coatings with excellent coating adhesion under bending and scratch resistance, as well as excellent corrosion resistance, humidity resistance and the like and therefore, the thus coated metal plates and especially hot dip galvanized sheet steel have been well accepted as exterior metal panels to be formed for the production of such products as roof materials, wall panels, weather doors, shutters and the like. However, for the coating of hot dip galvanized sheet steel to be processed under more severe conditions, for the production of implement, houshold appliance and the like, e.g. low deposit (180g/m² or less) hot dip galvanized sheet steel and low lead galvanized sheet steel, the coating vehicle should be of more flexible nature which in turn, causes lowering in the desired scratch resistance of the coating.

Therefore, a further development has been demanded in giving a metal surface treating composition which can be used in that particular field and result an excellent precoated metal plate for heavy forming use, with good coating adhesion under bending and scratch resistance, as well as corrosion resistance and other desired properties. The invention has been made to solve the abovementioned questions.

SUMMARY OF THE INVENTION

According to the invention, the following are provided to attain the abovesaid object:

1. A precoated metal plate having on its surface a coating which is prepared by applying an aqueous composition consisting essentially of a binder component (A) of an aqueous resin and hard inorganic microparticles (B) having Mohs' hardness of 3 to 9 and an average grain diameter of 0.1 to 20μ in a dry-film thickness of 0.05 to 5μ and which is characterized by having a percentage of horizontal sectional area of the inorganic microparticles protruded beyond the film surface of said binder component at the film surface of 5% or more.

2. A precoated metal plate having on its surface a coating which is prepared by applying an aqueous coating composition consisting essentially of a binder component (A) composed of an aqueous resin ($A_1$) and a water-soluble chromium compound ($A_2$) containing 30 to 90% by weight of hexavalent chromium and hard inorganic microparticles (B) having Mohs' hardness of 3 to 9 and an average grain diameter of 0.1 to 20μ in a dry-film thickness of 0.05 to 5μ and which is characterized by having a percentage of horizontal sectional area of the inorganic microparticles protruded beyond the film surface of said binder component (A) at the film surface of 5% or more.

The inventions have been made on the basis of the finding that when particular hard inorganic microparticles are present in a coating composition and located in a coating under specific conditions so that parts of said microparticles are protruded beyond the binder surface to certain extent, scratch resistance of the coating can be improved by the so-called anchor effect of said microparticles without sacrificing excellent coating adhesion under bending. The protruded microparticles will get into and are anchored to an overcoat and scratch resistance can be greatly improved by stress-relaxation, after all.

PREFERRED EMBODIMENTS OF THE INVENTION

In the first invention, the binder component (A) of the present aqueous composition comprises an aqueous resin, which may be of water soluble nature and/or water miscible nature. The term "aqueous reins" as used herein, therefore, denotes both water soluble resin and water dispersible resin.

Examples of water soluble resins are polyvinyl alcohol, alkyd hydroxyalkyl cellulose, polyacrylic acid and its derivative, polyacrylamide and its derivative, polyvinyl pyrrolidone, polyvinyl methyl ether, reaction products of maleic anhydride and vinyl or acryl compounds and the like, and examples of water dispersible resins are alkyd resin, phenol resin, amino resin, vinyl acetate, styrene-butadiene copolymer, acryl resin and natural or synthetic rubber emulsion. Among them, particularly preferable members are aqueous acryl resin emulsions herein under stated. That is, the first type of such preferable acryl resin emulsions are, as disclosed in Japanese Patent Publication No. 39393/81 and U.S. Pat. No. 4,170,671, prepared by emulsion polymerization of at least one α, β-monoethylenically unsaturated monomers in the presence of an emulsifier selected from a polyacrylic acid and a copolymer of acrylic acid and at least one monomer selected from the group consisting of methacrylic acid, acrylamide, methacrylamide and a hydrophilic monomer of the formula:

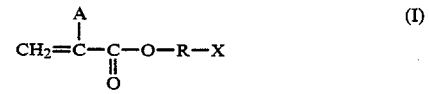

wherein A is hydrogen atom or methyl; R is a substituted or unsubstituted alkylene group having 2 to 4 carbon atoms and X is a functional group having at least one of oxygen atom, phosphorus atom and sulfur atom.

The emulsifier (i.e. the water-soluble polymer) is polyacrylic acid and a copolymer of acrylic acid and at least one compound selected from methacrylic acid, acrylamide (e.g. acrylamide and N-methylol-acrylamide), methacrylamides (e.g. methacrylamide and N-methylol methacrylamide) and a hydrophilic monomer of the above formula (I) [specific examples of the monomers wherein X is a functional group having oxygen atom are 2-hydroxyethyl acrylate, hydroxypropyl acrylate, 2-hydroxyethyl methacrylate, hydroxypropyl methacrylate, 3-hydroxybutyl acrylate, 2,2-bis(hydroxymethyl)ethyl acrylate, 2,3-dihydroxypropyl methacrylate, 3-hydroxybutyl methacrylate, etc.; specific examples of the monomers in the case where X is a functional group having phosphorus atom are (a) mono (2-hydroxyethyl methacrylate) acid phosphate of the formula:

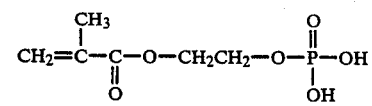

and (b) mono (3-chloro-2-hydroxypropyl methacrylate) acid phosphate of the formula:

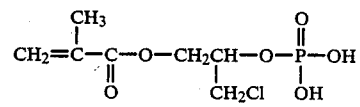

a specific example of the monomer in the case where X is a functional group having sulfur atoms is sulfonylethyl methacrylate, etc.].

The proportion of the acrylic acid to the other hydrophilic monomer in the above copolymer may be advantageously selected so as to make the content of the acrylic acid in the whole monomer in the range of 50% by weight or more, preferably 60% by weight or more, from the viewpoint of the stability of the said emulsion, adhesion property to the metal substrate, etc.

Preparation of such water-soluble polymers may be carried out in a conventional way (e.g. polymerization in an aqueous solution, block polymerization, polymerization in an organic solvent, etc.).

For instance, in case of the polymerization in an aqueous solution, the polymerization may be carried out by adding dropwise an acrylic acid or a mixture of acrylic acid and at least one of other hydrophilic monomers and an aqueous solution of water-soluble free radical catalyst other than an alkali metal salt (e.g. ammonium persulfate) from the separate dropping funnels to water (preferably a deionized water) which is kept at a temperature suitable for the reaction, and reacting the mixture with agitation at a temperature of 70° to 9020 C. The reaction time including dropping time is usually 3 to 5 hours.

The α, β-monoethylenically unsaturated monomers used in the present invention include acrylic esters (e.g. methyl acrylate, ethyl acrylate, isopropyl acrylate, n-butyl acrylate, 2-ethylhexyl acrylate, decyl acrylate isooctyl acrylate, 2-ethylbutyl acrylate, octyl acrylate, methoxyethyl acrylate, ethoxyethyl acrylate, 3-ethoxypropyl acrylate, etc.); methacrylic esters (e.g. methyl methacrylate, ethyl methacrylate, isopropyl methacrylate n-butyl methacrylate, isobutyl methacrylate, n-hexyl methacrylate, lauryl methacrylate, decyl methacrylate, octyl methacrylate, stearyl methacrylate, 2-methylhexyl methacrylate, glycidyl methacrylate, 2-ethoxyethyl methacrylate, cetyl methacrylate, benzyl methacrylate, 3- methoxybutyl methacrylate, etc.); acrylonitrile; methacrylonitrile; vinyl aceate; vinyl chloride; vinyl ketone; vinyl-toluene; and styrene, which may be used alone or in a mixture of two or more thereof. In addition to these monomers, there may also be used a small amount of the monomers which are previously mentioned in connection with the water-soluble polymer, such as acrylamides, methacrylamides and the hydrophilic monomers of the above formula (I). Particularly, when a hydroxy group-containing monomer (e.g. 2-hydroxyethyl methacrylate) is used, the formed polymer will react with the emulsifier having COOH group, thereby forming crosslinked product, and therefore, the formed coating can afford an extremely improved adhesion to the metal substrate.

Emulsion-polymerization of the α, β-monoethylenically unsaturated monomers can be carried out by using a conventional emulsion-polymerization method. However, at that time, the above mentioned specific water-soluble polymer must be used as the emulsifier and the catalyst must be a water-soluble catalyst containing substantially no alkali metal ion (which will give a bad influence on coating film as decrease in corrosion resistance and moisture resistance thereof).

For instance, the emulsion-polymerization may be carried out by adding dropwise simultaneously the α, β-monoethylenically unsaturated monomer and aqueous (preferably a deionized water) solution of an alkali metal-free water-soluble catalyst (e.g. ammonium persulfate) and optionally a part of the emulsifier from the separate dropping funnels to water (preferably a deionized water) containing all or remaining part of the emulsifier which is kept at a temperature suitable for the reaction, and then reacting with agitation the mixture at a temperature of 50° to 70° C., preferably 55° to 65° C. The reaction time including dropping time is usually 3 to 7 hours. The emulsifier is used in an amount of 20 parts by weight or more, preferably 20 to 50 parts by weight, in the solid content) to 100 parts by weight of the α, β-monoethylenically unsaturated monomer. When the amount of the emulsifier is less than 20 parts by weight, the emulsion has an inferior storage stability and hence cannot be used. Whereas, the use of emulsifier in excess of 50 parts by weight can not specifically provide any further improvements in storage stability of the emulsion and chemical stability to water-soluble chromium compounds but rather produce such problems as undesired foaming of emulsion.

By the adoption of such emulsion-polymerization, a uniform, stable emulsion having about 30% by weight of solid content can be obtained. When the emulsion is incorporated into the treating liquid, an epoxy resin such as a bisphenol type epoxy resin (e.g. Epicoat 828 and Epicoat 1001, trade name of Shell Chemical) may optionally be used together as a hardening agent. The epoxy resin may also be incorporated into the emulsion by dissolving it in the α, β-monoethylenically unsaturated monomers to be polymerized. The use of such epoxy resin can afford a coating with further improved paint adhesion properties.

In order to improve bending properties and scratch resistance of the coating, the binder component may be composed of an emulsion of hard polymer microparticles as disclosed in Japanese Patent Application Kokai No. 213064/83.

This type of emulsion may be advantageously prepared by the similar emulsion polymerization as stated in the preceeding paragraph, excepting using as a part of α, β-ethylenically unsaturated monomers, a polyfunctional monomer having 2 or more radically polymerizable, ethylenic unsaturation bonds, thereby causing internal gelation of the polymer particles or selecting monomers so as to give hard particles of polymer having a glass transition point of 15° to 110° C. As the polyfunctional monomers, preference is given to esters of unsaturated monocarboxylic acids with polyhydric alcohols, esters of polycarboxylic acids with unsaturated alcohols and aromatic compounds substituted with two or more vinyl groups. Typical examples are ethylene glycol diacrylate, ethyleneglycol dimethacrylate, triethylene glycol dimethacrylate, tetraethylene glycol dimethacrylate, 1,3-butylene glycol dimethacrylate, trimethylol propane triacrylate, trimethylol propane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate and divinyl benzene. The amount of polyfunctional monomer may be varied in a wider range, providing giving sufficient internal gelation of the formed polymer, and however, it is usually in a range of 0.01 to 20%, preferably 0.1 to 10%, by weight, of the total monomers.

The emulsion of hard polymer microparticles having a glass transition point (Tg-value) from 15° to 110° C. is likewise useful as an aqueous resin binder component in this invention. Since Tg value of a given polymer may be easily estimated and calculated from the kinds and amounts of the monomers to be polymerized, it is within common knowledge in the art to select appropriated members from the known α, β-ethlenically unsaturated monomers for this end. The present aqueous resin may also be an emulsion of hard polymer microparticles comprising at least one α,β-ethylenically unsaturated monomers, bearing thereon, as protective colloid, an oligomer with hydrophylic groups comprising at least one α, β-ethylenically unsaturated monomer and being composed of hard polymer with internal gelation or higher glass transition point from 15° to 110° C., as disclosed in Japanese Patent Application Kokai No. 197575/84 and U.S. Pat. No. 4,540,733.

Such emulsion may be advantageously prepared as follows: That is, at least one α, β-ethylenically unsaturated monomer is polymerized in an aqueous medium in the presence of initiator to give an oligomer with hydrophilic groups of low molecular weight, preferably of less than about 10,000. At that time, the abovesaid hydrophilic groups as, for example, carboxyl group, sulfonic acid group or the like, may be introduced to the oligomer from either polymerization monomer or initiator used.

To this aqueous oligomer solution, are added in the presence of initiator, α, β-ethylenically unsaturated monomers (which include, as a part of said monomers, a compound having two or more radically polymerizable unsaturated bonds, i.e. polyfunctional monomer, for internal gelation purpose, or which are selected so as to give a polymer with a defined Tg value) and reacted according to an emulsion polymerization technique to obtain the intended emulsion of hard polymer microparticles.

The other component of the present metal surface pretreating composition is hard inorganic microparticles having Mohs' hardness of 3 to 9. If the Mohs' hardness of said inorganic microparticles is less than 3, the desired scratch resistance cannot be obtained, whereas if the Mohs' hardness is over 9, it is too difficult to obtain the inorganic microparticles with the desired fine particle size by pulverization and moreover, no additional improvement in scratch resistance can be expected with such microparticles. Examples of appropriated materials are quartz, crystalbarite, natural silica as amorphous silica, wollastonite, orthoclase, sillimanite, zircon, willemite, olivine, titanium oxide, iron oxide and the like. However, they are only examples and many other inorganic substances may be satisfactory used providing having Mohs' hardness of 3 to 9.

The inorganic microparticles used, however, must have an average grain size of 0.1 to 20μ. This is because if the inorganic microparticles are too fine (less than 0.1μ in size), it is unable to obtain the desired improvement in scratch resistance of the coating, and if the particle size is more than 20μ, there arises a question of decrease of bending properties (e.g. coating adhesion properties). Such inorganic microparticles may be of single kind or mixture of different materials, providing having the desired Mohs' hardness and particle size. As to the particle size distribution, preference is given to as close to normal distribution as possible.

The present metal surface pretreating composition (i.e. aqueous composition) consists essentially of the abovesaid binder component of aqueous resin (A) and hard inorganic microparticles (B).

Said aqueous resin is, as already stated, used in the form of aqueous solution or emulsion and present in the aqueous composition, in general, in a solid content of 5 to 500 g/l. The hard inorganic microparticles (B) are preferably dispersed in a certain amount of aqueous resin solution or emulsion or water and then added to the binder component of aqueous resin (A). The content of said inorganic microparticles (B) in the present aqueous composition is preferably determined in a range of 10 to 1000 g/l. However, these contents of aqueous resin and inorganic microparticles are only for guidance purpose and they are freely selected each in appropriate range so as to give an aqueous composition capable of resulting a uniform coating of desired thickness with an optimum coating weight. If desired, water and preferably deionized water is added to adjust the viscosity of said composition.

The aforesaid treating aqueous composition may be further added with some inorganic compounds which can release an inorganic ion (other than alkali metal ions), as $Zn^{2+}$, $Co^{2+}$, $Ni^{2+}$, $Fe^{2+}$, $Fe^{3}$, $PO_4^{3-}$, $F^-$, $BF_4^-$, $SiF_6^{2-}$ or the like. Incorporation of such compound can afford a more uniform and improved adhesion coating film on the metal surface. In this invention, thus obtained aqueous composition is applied on the surface of metal (e.g. iron, galvanized steel, aluminium and the like) by conventional means as roll coating, mist spraying and dipping, and then subjected to drying. However, the invention requires that the dry film thickness is within a range of 0.05 to 5μ and that parts of said inorganic microparticles be protruded beyond the film surface of binder component.

That is, in the present invention, it is required that average dry film thickness (V) calculatable by the following equation:

$$V = \frac{\text{coating weight of aqueous resin }(A)}{\text{specific gravity of aqueous resin }(A)} + \frac{\text{coating weight of hard inorganic microparticles }(B)}{\text{specific gravity of hard inorganic microparticles }(B)}$$

wherein V stands for average film thickness (μ) and coating weight is expressed in terms of solid g/m², should be 0.05 to 5μ, and preferably 0.2 to 2μ.

If the dry film thickness is less than 0.05μ, there is a tendency that scratch resistance of the coating be lowered and if it is over 5μ, there is an undesirable decrease in bending processability.

In the present invention, it is further required that percentage of horizontal sectional area of the inorganic microparticles protruded beyond the film surface of binder component at the film surface should be 5% or more. Said percentage may be calculated by measuring the horizontal sectional area of the protruded inorganic microparticles microscopically, or comparing electron micrograph of the coating with ANSI/ASTM D 610-68 charts.

The inventors have surprisingly found that if the percentage of horizontal sectional area of the inorganic microparticles protruded beyond the film surface of binder component (hereinafter called as effective particle area percentage S*) is 5% or more, preferably 5 to 75% and most preferably 5 to 50%, scratch resistance and coating adhesion properties are greatly improved by the anchor effect of said protruded microparticles, and that if the said percentage is less than 5%, there is a tendency that scratch resistance be lowered, whereas if the said percentage is more than 75%, bending properties (coating adhesion properties) be adversely affected.

Since the horizontal sectional area of the protruded inorganic microparticles can be changed by varying the particle size, amounts and coating film thickness and the like and effective particle area percentage S* can be determined by measuring the total area of binder film surface and protruded particle area microscopically, the desired effective particle area percentage S* may be obtained even by trial and error method and repeating experiments.

However, the present aqueous composition and coating weight may be determined, starting from the presettled effective particle area percentage S*, as follows:

Under the condition that average grain diameter (L) of hard inorganic microparticles (B) is larger than the film thickness (H) of binder component (A), the horizontal sectional area of inorganic microparticles protruded beyond the film surface of binder component (i.e. effective particle are) may be varied with the change in said L and said H values.

When the inorganic microparticles each is taken as cubic mass, the following equation would be materialized for the present precoat metal plate.

$$\frac{\text{volume of hard microparticles}}{\text{volume of coating film}} =$$

$$\frac{\text{diameter of hard microparticles} \times \text{surface area of hard microparticles}}{\text{thickness of coating film} \times \text{surface area of coating film}}$$

wherein the ratio of volume of hard microparticles to volume of coating film stands for volume percentage (P) of hard microparticles (in solid), diameter of hard microaprticles stands for average grain diameter (L) of said microaprticles, thickness of coating film is average coating thickness (V), and the ratio of surface area of hard microparticles to surface area of coating film is now defined as S. The abovesaid equation may be rewritten in the following way.

$$V = \frac{S \times L}{P}$$

If L is larger than H, S is nearly equal to S*. Therefore, at that time, the following is materialized.

$$V = \frac{S^* \times L}{P}$$

When an aqueous composition is designed so as to give a defined S* value (selected from the range 5 to 75%), V value is calculated from the selected S*, L and P (which is determined so as to be higher than S*), using the abovesaid equation.

Since specific gravity of coating can be calculated from the volume percentage and specific gravity of the respective constituting component, the desired coating weight (W) may be determined by the multiplication of said specific gravity of coating and V value.

The inventors have also found that the desired effects of this invention are most fully attained when S*, P and L values are selected so as to give an average film thickness (V) of 0.2 to 2μ.

The film coating with the present aqueous composition may be carried out in a single step or in multiple stage of steps as desired.

The metal plate to be coated with the present aqueous composition may be previously treated with a conventional chromate treating bath if desired. By adopting such a chemical conversion technique, improved anticorrosive properties are given to the present precoated metal plate. The inventors have also found that precoated metal plate for heavy forming use can be likewise obtained with an aqueous composition consisting essentially of a binder component of aqueous resin, a water-soluble chromium compound and hard inorganic microparticles and at that time, an excellent anticorrosive property is given to the precoated metal plate, as well as excellent coating adhesion under bending and scratch resistance.

Therefore, in the second aspect of this invention, is provided a precoated metal plate having on its surface a coating which is prepared by applying an aqueous coating composition consisting essentially of a binder component (A) composed of an aqueous resin ($A_1$) and a water-soluble chromium compound ($A_2$) containing 30 to 90% by weight of hexavalent chromium and hard inorganic microparticles (B) having Mohs' hardness of 3 to 9 and an average grain diameter of 0.1 to 20μ in a dry-film thickness of 0.05 to 5μ and which is characterized by having a percentage of horizontal sectional area of the inorganic microparticles protruded beyond the film surface of said binder component at the film surface of 5% or more.

This invention differs from the first invention only in the point that the aqueous composition contains, besides an aqueous resin and hard inorganic microparticles, a water-soluble chromium compound containing 30 to 90% by weight of hexavalent chromium.

The water-soluble chromium compound used in the present invention includes any conventional chromium compounds, but chromates are not necessarily preferable because the aqueous composition should not contain such metallic ions as alkali metal ions and anionic ions which are harmful to an anticorrosive coating. From this standview, the most suitable chromium compound is chromic anhydride ($Cr_3O$). It is important in the present invention that said chromium compound contains 30 to 90% by weight, preferably 40 to 60% by weight, of hexavalent chromium based on the total chromium content. When the hexavalent chromium content is less that 30% by weight, not only the corrosion resistance of the coated plate is lowered, but also the processing characteristics of the product are deteriorated. On the other hand, when the hexavalent chromium content is more than 90% by weight, the chromium compound tends to effuse out from the coating film, resulting the lowering in corrosion resistance and moisture resistance of the coating. The chromium other than hexavalent chromium in said chromium compound are predominantly a trivalent chromium. It is in general known that when the trivalent chromium is contained, corrosion resistance and adhesion properties are improved, but stability of the aqueous composition is unfavorably lowered. However, when an emulsion of hard polymer microparticles internally gelated or having a high glass transition point is used, a stable aqueous composition is obtained even if the trivalent chromium is contained in the chromium compound. Therefore, in practice, the hexavalent chromium is partially reduced to trivalent chromium by using a reducing agent as formaldehyde and the like. Such chromium compound is usually compounded with an aqueous composition comprising an aqueous resin and hard inorganic microparticles in an amount of 5 to 500 g as Cr per liter of the composition. In the preparation of this type of aqueous composition, exactly the same method as previously stated in connection with the first invention may be used and the coating weight is determined in the same way. However, binder film thickness (H) is determined by the following:

$$H = \frac{\text{coating weight of aqueous resin } (A_1)}{\text{specific gravity of aqueous resin } (A_1)} +$$

$$\frac{\text{coating weight of water soluble chromium compound } (A_2)}{\text{specific gravity of water-soluble chromium compound } (A_2)}$$

and average film thickness (V) is expressed by the formula:

$$V = \frac{\text{coating weight of aqueous resin } (A_1)}{\text{specific gravity of aqueous resin } (A_1)} + \frac{\text{coating weight of hard inorganic microparticles } (B)}{\text{specific gravity of hard inorganic microparticles } (B)} + \frac{\text{coating weight of water-soluble chromium compound } (A_2)}{\text{specific gravity of water-soluble chromium compound } (A_2)}$$

The aqueous composition is applied to a metal surface so as to give a coating of 0.05 to 5μ dry-film thickness which is characterized by having a percentage of horizontal sectional area of the inorganic microparticles protruded beyond the film surface of binder component at the film surface of 5% or more, preferably 5 to 75% and most preferably 5 to 50%. In one variant of this invention, the coating may be prepared by the combination of two steps, the first step comprising applying an aqueous composition containing an aqueous resin and a water-soluble chromium compound and the second step comprising applying an aqueous composition containing an aqueous resin and hard inorganic microparticles. This is particularly preferred in that improved coating adhesion and corrosion resistance are given by the said first step and improved scratch resistance by the second coating step.

The treating aqueous composition comprising an aqueous resin, a water-soluble chromium compound and hard inorganic microparticles is applied to the surface of metals (e.g. iron, galvanized steel, aluminium etc.) by conventional methods such as roll coating mist spraying, dipping and the like and dried.

Drying of the coating is carried out under condition that moisture in the coated film can be removed but the resin cannot be molten, for instance, at the plate temperature of not higher than 120° C., preferably 80° to 110° C., for 1 to 60 seconds. In practice, the metal to be dried is kept at an atmosphere of a little higher temperature than the abovesaid metal plate temperature. For instance, in case a treating aqueous composition having total solid content of 20 to 50% by weight is applied to a metal surface to form a coating of 500 mg/m² to 1 g/m², the drying is carried out at an atmospheric temperature of 100° C. for 30 to 60 seconds or at an atmospheric temperature of 200° C. for 7 to 8 seconds. When the drying temperature is too high, the resin is molten and the coating film loses the rough surface, which results in deterioration of coating adhesion and scratch resistance of the coating.

Since the treating aqueous composition of the present invention is free from a conventional surfactant and alkali metal ions and contains an amount of hard inorganic microparticles, the coated plate shows excellent corrosion resistance, moisture resistance and highly improved processability and scratch resistance, as well.

According to the invention, no particular device is required for the maintenance of the treating aqueous composition bath and therefore, continuous production of precoat metal can be done merely by supplementing intermittently the consumed amount of the same treating aqueous composition as used in the starting bath.

Furthermore, since the rinsing and other after-treatment are not required, the processing steps are minimized and further no specific apparatus is required for the treatment of waste water as is the case in a conventional metal pretreatment.

EXAMPLE 1

(1) Preparation of emulsion (EM 51)

Into a flask fitted with a stirrer, a reflux condenser, a thermometer and two dropping funnels, there were charged 150 parts of deionized water and 120 parts of water-soluble copolymer obtained by copolymerization of acrylic acid and 2-hydroxyethyl methacrylate in a weight ratio of 8:2 (25% aqueous solution, molecular weight Mw=66,000) and the mixture was heated to 60° to 65° C. under stirring. Then, a monomer mixture consisting of 50 parts of methyl methacrylate, 27 parts of styrene, 10 parts of 2hydroxyethyl methacrylate, 10 parts of n-butyl methacrylate and 3 parts of ethyleneglycol dimethacrylate, and a catalyst solution consisting of 2 parts of ammonium persulfate and 50 parts of deionized water were separately and simultaneously added dropwise from the dropping funnels over a period of 3 hours. After completion of said addition, the resultant mixture was kept at 60° to 65° C. for about 2 hours to complete polymerization reaction to give an aqueous acrylic emulsion (EM 51) having a solid content of 30.0%. Specific gravity of solid matter was 1.1.

(2) Preparation of aqueous treating composition (a)

For the object of preparing a coating with an effective particle area percentage (S*) of 10%, the following aqueous treating composition (a) was prepared.

The abovementioned emulsion (EM 51), Deoxylite 41 N-1 (aqueous chromium compound solution obtained by adding aqueous formalin solution to 18% aqueous chromic anhydride solution, thereby reducing about 40% of hexavalent chromium to trivalent chromium, trade name of Nippon Paint Co., Ltd., solid content 17.3%, specific gravity of solid 2.63), and a dispersion of Imusil A 108 (natural silica microparticles having an average grain diameter 2.8μ, Mohs' hardness 6.5 and specific gravity 2.65) in deionized water (solid content 19%) were mixed well at a room temperature, each in the indicated amounts in Table 1, to obtain an aqueous treating composition (a).

(3) Surface treatment of metal plate

Average film-thickness (V) of the abovesaid aqueous treating composition (a) (S=10, L=2.8, P=45, see Table 1) for the purpose of obtaining a coating with an effective particle area percentage (S*) of 10% was calculated by using the equation:

$$V = \frac{S \times L}{P}$$

and it was found the required film-thickness was 0.62μ. Since the specific gravity of solid matter of said composition (a) was 2.10, the coating weight (g/m²) (W) was determined to be 1.31 g/m².

Then, the abovesaid aqueous treating composition (a) was applied with a roll coater to the surface of a galvanized sheet steel for heavy forming use (Zn coverage 90 g/m², 0.5 m/m) previously degreased with an alkali degreasing agent (RIDOLINE No. 155, trade name of Nippon Paint Co., Ltd.) so as to be the coating weight of 1.31 g/m² and immediately thereafter, the coated plate was dried at 100° C. for 40 seconds. Thus surface-treated galvanized sheet steel was then coated with a high molecular weight polyester type base coat (molecular weight of base resin Mw=14,000) and a high molecular weight polyester type top coat (molecular weight of base resin Mw=25,000) in a conventional way. Their dry-thicknesses were 5μ and 15μ, respectively. Thus obtained metal plate was subjected to scratch resistance test and bending test and the results were shown in Table 1.

EXAMPLE 2

(1) Preparation of emulsion (EM 48)

The similar procedures as stated in Example (1) were repeated excepting substituting a monomer mixture of 35 parts of methyl methacrylate, 15 parts of styrene, 10 parts of 2-hydroxyethyl methacrylate and 40 parts of n-butyl acrylate for the monomer mixture of Example 1 (1) to obtain an emulsion (EM 48) having a solid content of 30.1% and a specific gravity of solid matter of 1.1.

(2) Preparation of treating composition (b)

For the obtainment of a coating having an effective particle area percentage (S*) of 20%, the following treating composition (b) was prepared.

The abovesaid emulsion (EM 48), Deoxylite 41 N-1 and a dispersion of Crystalite 5X (trade name of natural silica microparticles having an average grain diameter 0.9μ, Mohs' hardness 7, specific gravity 2.65, of Ryumori-Sha) in deionized water (solid content 17.5%) were mixed, each in the indicated volume % in Table 1, at a room temperature to obtain an aqueous treating composition (b).

(3) Surface treatment of metal plate

Average film-thickness (V) of the abovesaid aqueous treating composition (b) (S=20, L=0.9, P=30) for the purpose of obtaining a coating with an effective particle area percentage (S*) of 20% was calculated as in Example 1 and it was found the required film-thickness was 0.60μ. Since the specific gravity of solid matter of the composition (b) was 1.95, the required coating weight (W) was determined to be 1.17 g/m². The similar experiment as stated in Example 1 (3) was repeated with the abovesaid coating weight (W) and thus obtained precoated metal plate was subjected to the same tests as used in Example 1 and the results obtained were shown in Table 1.

EXAMPLE 3

In this experiment, the same aqueous treating composition as used in Example 2 was prepared. Average film-thickness (V) of the aqueous treating composition (b) (S=20, L=0.9, P=30) for the purpose of obtaining a coating with an effective particle area percentage (S*) of 7% was calculated by the equation:

$$V = \frac{S \times L}{P}$$

and it was found that the required (V) value was 0.21μ. Since the specific gravity of solid matter of the composition (b) was 1.95, the required coating weight (W) was determined to be 0.41 g/m².

The similar experiment as stated in Example 1 was repeated with the abovesaid composition (b) and its coating weight (W) and the precoated metal plate thus obtained was tested as in Example 1.

The results are shown in Table 1.

EXAMPLE 4

An aqueous treating composition (c) was prepared by the similar method as stated in Example 1, excepting substituting Julimer AC10L (trade name, water-soluble acryl resin, molecular weight 30,000, solid content 40%, specific gravity of solid matter 1.1, manufactured by Nihon Junyaku-Sha) for EM 51 and a dispersion of titanium oxide (average grain diameter 0.5μ, Mohs' hardness 6.5, specific gravity 4.2) in deionized water (solid content 28%) for the aqueous dispersion of Imusil A 108. Then, a average film-thickness (V) of the treating composition (c) (S=30, L=0.5, P=45) for the purpose of obtaining a coating with an effective particle area percentage (S*) of 30% was calculated by the equation:

$$V = \frac{S \times L}{P}$$

and found to be 0.33μ.

Since the specific gravity of solid matter of said composition (c) was 2.80, the required coating weight (W) was determined to be 0.93 g/m².

With these data, a similar precoated metal plate was prepared and tested as in Example 1. The test results are shown in Table 1.

EXAMPLE 5

For the obtainment of a coating with an effective particle area percentage (S*) of 5%, an aqueous treating composition (d) was prepared by using the indicated volume percentages of emulsion (EM 51), Crystalite aqueous dispersion of Example 2 and Deoxylite 41 N-1 of Example 1 as given in Table 1.

The required average film-thickness (V) of this treating composition (d) (S=5, L=0.9, P=2) for the purpose of obtaining a coating with an effective particle area percentage (S*) of 5% was calculated to be 0.38μ. Since the specific gravity of solid matter of the composition (d) was 1.56, the coating weight (W) was determined to be 0.59 g/m².

The similar experiment as stated in Example 1 was repeated with the aforesaid composition (d) and the abovementioned coating weight (W) to obtain a precoated metal. (The first pretreatment step).

Next, the same precoating as stated in Example 1 was repeated with the treating composition (a). (The second pretreatment step) on thus obtained precoated metal. Thereafter, a base coat and a top coat was applied as in Example 1 and the similar scratch resistance test and bending test were carried out. The results obtained are shown in Table 1.

COMPARATIVE EXAMPLE 1

(1) Preparation of an aqueous treating composition (e)

The emulsion (EM 48) obtained in Example 2, Deoxylite 41 N-1 and a dispersion of Aerosil 300 (fine silicic anhydride having an average grain diameter of 7 mμ, Mohs' hardness of 6 to 7 and a specific gravity of 2.15, trade name of Nihon Aerosil Co.) in deionized water (solid content 15%) were, each in the indicated solid volume % in Table 1, mixed well at a room temperature to obtain an aqueous treating composition (e).

(2) Surface treatment of metal plate

The abovesaid treating composition (e) was applied with a roll coater to the surface of a galvanized sheet steel for heavy forming use (Zn coverage 90 g/m², 0.5 mm plate thickness) previously degreased with an alkali degreasing agent (RIDOLINE No. 155, trade name of Nippon Paint Co., Ltd.) so as to be the coating weight of 0.20 g/m² and immediately thereafter, the coated plate was dried at 100° C. for 40 seconds.

Then, a high molecular weight polyester type base coat (molecular weight of base resin Mw=14,000) and a high molecular weight polyester type top coat (molecular weight of base resin Mw=25,000) were applied each in dry-film thickness of 5μ and 15μ, respectively, in a conventional way. Thus obtained metal plate was subjected to scratch resistance test and bending test and the results obtained were shown in Table 1.

COMPARATIVE EXAMPLE 2

With the intention of obtaining a coating with an effective particle area percentage (S*) of 10%, an aqueous treating composition (f) was prepared by using each indicated volume % of the emulsion (EM 48) obtained in Example 2, Deoxylite 41 N-1 of Example 1 and a dispersion of talc (average grain diameter of 3μ, Mohs' hardness of 1, specific gravity of 2.7) in deionized water (solid content 18%) as shown in Table 1.

The required average film-thickness (V) of the treating composition (f) (S=10, L=3, P=45) for the preparation of a coating having an effective particle area percentage (S*) of 10% was calculated by the equation:

$$V = \frac{S \times L}{P}$$

and it was found to be 0.67μ. Since the specific gravity of solid matter of said composition (f) is 2.13, the coating weight (W) was determined to be 1.42 g/m².

Using the abovesaid treating composition (f) and its coating weight (W), a precoated metal plate was prepared as in Comparative Example 1 and scratch resistance test and bending test were carried out with the coated plate. The test results obtained are shown in Table 1.

Test methods and evaluation of test results used in Table 1.

(1) Scratch resistance:

The surface of the coated plate is pressed and scratched with a coin and degree of surface injure is observed.

- ⊙ not injured
- ○ slightly injured
- Δ markedly injured
- × coating peeled off (2) Bending resistance A coated plate (5 cm in width) is vised and bent at an angle of 180° in a constant temperature room maintained at 20° C. and cracking conditions at the bent portion are observed. At that time, when n sheets of uncoated plate (same size and same material) are sandwiched within the bent coated plate, test result is expressed in terms of nT.

Bending resistance (i.e. processability) is evaluated by the minimum nT value showing no cracks at the bent portion of the coated plate.

TABLE 1

| Example | 1 | 2 | 3 |
|---|---|---|---|
| Step | 1 | 1 | 1 |
| Aqueous treating composition | a | b | b |
| average specific gravity (ρ) of solid matter | 2.10 | 1.95 | 1.95 |
| emulsion | EM 51 | EM 48 | EM 48 |
| solid volume % | 35 | 45 | 45 |
| water-soluble chromium compound | Deoxylite 41 N-1 | Deoxylite 41 N-1 | Deoxylite 41 N-1 |
| solid volume % | 20 | 25 | 25 |
| hard microparticles | Imusil A 108 | Crystalite 5X | Crystalite 5X |
| solid volume % | 4 | 30 | 30 |
| Mohs' hardness | 6.5 | 7 | 7 |
| average diameter (L) | 2.8μ | 0.9μ | 0.9μ |
| Characteristics of precoat volume % of hard microparticles in the composition (P) | 45 | 30 | 30 |
| effective particle area percent. (S*) | 10–16 | 16–33 | 7–10 |
| coating weight (W) g/m² | 1.31 | 1.17 | 0.41 |
| Cr weight mg/m² | 169 | 206 | 72 |
| average film-thickness (V) (μ) | 0.62 | 0.60 | 0.21 |
| Test results on coated plate |  |  |  |
| scratch resistance | ⊙ | ⊙ | ○ |
| bending resistance | 3T | 2T | 2T |

| Example | 4 | 5 | 5 |
|---|---|---|---|
| Step | 1 | 1 | 2 |
| Aqueous treating composition | c | d | a |
| average specific gravity (ρ) of solid matter | 2.80 | 1.56 | 2.10 |
| emulsion | Julimer AC 10L | EM 51 | EM 51 |
| solid volume % | 35 | 70 | 35 |
| water-soluble chromium compound | Deoxylite 41 N-1 | Deoxylite 41 N-1 | Deoxylite 41 N-1 |
| solid volume % | 20 | 18 | 20 |
| hard microparticles | titanium oxide | Crystalite 5X | Imusil A 108 |
| solid volume % | 45 | 12 | 45 |
| Mohs' hardness | 6.5 | 7 | 6.5 |
| average diameter (L) | 0.5μ | 0.9μ | 2.8μ |

TABLE 1-continued

| Characteristics of precoat volume % of hard micro- | | | |
|---|---|---|---|
| particles in the composition (P) | 45 | 12 | 45 |
| effective particle area percent. (S*) | 30–35 | 3–5 | 10–16 |
| coating weight (W) g/m² | 0.93 | 0.59 | 1.31 |
| Cr weight mg/m² | 97 | 92 | 169 |
| average film-thickness (V) (μ) | 0.33 | 0.38 | 0.62 |
| Test results on coated plate | | | |
| scratch resistance | ◉ | ◉ | ◉ |
| bending resistance | 4T | 2T | 2T |

| Comparative Example | 1 | 2 |
|---|---|---|
| Step | 1 | 1 |
| Aqueous treating composition | e | f |
| average specific gravity (ρ) of solid matter | 1.90 | 2.13 |
| emulsion | EM 48 | EM 48 |
| solid volume % | 40 | 35 |
| water-soluble chromium compound | Deoxylite 41 N-1 | Deoxylite 41 N-1 |
| solid volume % | 35 | 20 |
| hard microparticles | Aerosil 300 | talc |
| solid volume % | 25 | 45 |
| Mohs' hardness | 6–7 | 1 |
| average diameter (L) | 7mμ | 3μ |
| Characteristics of precoat volume % of hard micro- | | |
| particles in the composition (P) | 25 | 45 |
| effective particle area percent. (S*) | 0 | 10 |
| coating weight (W) g/m² | 0.20 | 1.42 |
| Cr weight mg/m² | 50 | 182 |
| average film-thickness (V) (μ) | 0.11 | 0.67 |
| Test results on coated plate | | |
| scratch resistance | Δ | Δ |
| bending resistance | 2T | 4T |

EXAMPLE 6

(1) Preparation of aqueous treating composition (g)

An aqueous treating composition (g) was prepared by mixing at a room temperature, each indicated volume percentage of emulsion (EM 51) and a dispersion of Crystalite VX-S2 (natural silica fine particles having an average grain diameter of 5μ, Mohs' hardness of 7, and a specific gravity of 2.65, trade name of Tatsumori-sha) in deionized water (solid content 17.5%) as shown in Table 2. The specific gravity of solid matter of said composition (g) was 1.88.

(2) Surface treatment of metal plate

The required average film-thickness (V) of said composition (g) (S=10, L=5, P=50) for the purpose of obtaining a coating with an effective particle area percentage (S*) of 10% was calculated by using the equation:

$$V = \frac{S \times L}{P}$$

and it was determined to be 1μ.

Since the specific gravity of solid matter of said composition (g) was 1.88, the required coating weight (W) was determined to be 1.88 g/m².

Using the abovementioned treating composition (g) and its coating weight (W), the similar precoated metal plate as shown in Example 1 was prepared. Next, a general building-use paint was applied thereon. That is, as a base coat, was applied a urethane modified epoxyester type coating composition and as a top coat, an oil-free polyester type coating composition (molecular weight of base resin, Mw=3000), in dry-film thicknesses of 5μ and 15μ, respectively. The coated plate was subjected to scratch resistance test and bending test, and the test results were shown in Table 2.

In Table 2, the scratch resistance was evaluated by the same method and evaluation standard as used in Table 1. However, bending resistance was evaluated as follows. Bending resistance:

The coated plate (width: 5 cm) is bent at an angle of 180°, with 2 sheets of uncoated plate (same size and same material) sandwitched therebetween, and a pressure-sensitive adhesive tape is adhered onto the bent surface of said coated plate and then peeled off. Peeling conditions of the coating are evaluated as follows.
◉ no peeling
○ 1 to 2 spot-peeling
Δ moderate peeling
× more than half coating peeled off

EXAMPLE 7

The required film-thickness (V) of treating composition (g) (S=30, L=5, P=50) for the purpose of obtaining a coating with an effective particle area percentage (S*) of 30% was calculated as in Example 6 and it was found to be 3μ. Since an average specific gravity of solid matter of said composition (g) wa 1.88, the coating weight (W) was determined to be 5.64 g/m².

The similar precoated metal plate and coated plate as stated in Example 6 were prepared, excepting substituting the coating weight of 5.64 g/m² for 1.88 g/m².

The scratch resistance test and bending test were carried out and test results were shown in Table 2.

COMPARATIVE EXAMPLE 3

An aqueous treating composition (h) for comparative purpose was prepared by using emulsion (EM 51) of Example 1 and an aqueous dispersion of Aerosil 300 of Comparative Example 1, each in indicated volume percentage in Table 2.

Thus obtained composition was applied with a roll coater to the same degreased galvanized sheet steel for heavy forming use (Zn coverage 90 g/m², 0.5 mm thickness) as used in Example 1, so as to be the coating weight of 1.42 g/m², and immediately thereafter, the coated plate was dried at 100° C. for 40 seconds. Then, a base coat and a top coat were applied thereonto and tested as in Example 6.

The test results are shown in Table 2.

TABLE 2

| Example | 6 | 7 |
|---|---|---|
| Aqueous treating composition | g | g |
| average specific gravity of solid matter (ρ) | 1.88 | 1.88 |
| emulsion | EM 51 | EM 51 |
| solid volume % | 50 | 50 |
| hard microparticles | Crystalite VX-S2 | Crystalite VX-S2 |
| solid volume % | 50 | 50 |
| Mohs' hardness | 7 | 7 |
| average diameter (L) | 5μ | 5μ |
| Characteristics of precoat | | |
| volume percentage of hard microparticles in the composition (P) | 50 | 50 |
| effective particle area percentage (S*) | 10–16 | 30–35 |
| coating weight (W) g/m² | 1.88 | 5.64 |
| average film-thickness (V) (μ) | 1 | 3 |
| Test results on coated plate | | |
| scratch resistance | ◯ | ◯ |
| bending processability | ◎ | ◎ |

| Comparative Example | 3 |
|---|---|
| Aqueous treating composition | h |
| average specific gravity of solid matter (ρ) | 1.42 |
| emulsion | EM 51 |
| solid volume % | 70 |
| hard microparticles | Aerosil 300 |
| solid volume % | 30 |
| Mohs' hardness | 6–7 |
| average diameter (L) | 7 mμ |
| Characteristics of precoat | |
| volume percentage of hard microparticles in the composition (P) | 30 |
| effective particle area percentage (S*) | 0 |
| coating weight (W) g/m² | 1.42 |
| average film-thickness (V) (μ) | 1 |
| Test results on coated plate | |
| scratch resistance | X |
| bending processability | ◎ |

What is claimed is:

1. A precoated metal plate for heavy forming use comprising a metal plate having on its surface a coating which has excellent adhesion to the metal plate under bending and processing conditions and which also has excellent scratch and corrosion resistant properties, said precoated metal plate prepared by applying to the surface of said metal plate an aqueous coating composition consisting essentially of a binder component (A) composed of an aqueous resin (A₁) and a water-soluble chromium compound (A₂) containing 30 to 90% by weight of hexavalent chromium and hard inorganic microparticles (B) having a Mohs' hardness of 3 to 9 and an average grain diameter of 0.1 to 20μ in a dry-film thickness of 0.05 to 5μ and which is characterized by having a percentage of horizontal sectional area of the inorganic microparticles protruded beyond the film surface of said binder component (A) at the film surface of 5% or more.

2. A precoated metal plate according to claim 1, wherein the hard inorganic microparticles have an average grain diameter which is larger than the film thickness (H) (μ) of the binder component determined by the equation:

$$H(\mu) = \frac{\text{coating weight of aqueous resin } (A_1) \text{ (solid g/m}^2\text{)}}{\text{specific gravity of aqueous resin } (A_1)} + \frac{\text{coating weight of water-soluble chromium compound } (A_2) \text{ (solid g/m}^2\text{)}}{\text{specific gravity of water-soluble chromium compound } (A_2)}$$

3. A precoated metal plate according to claim 1 in which the percentage of horizontal sectional area of the inorganic microparticles protruded beyond the film surface of the binder component at the film surface is between 5 and 75%.

4. A precoated metal plate according to claim 1 in which the percentage of horizontal sectional area of the inorganic microparticles protruded beyond the film surface of the binder component at the film surface is between 5 and 50%.

5. A resin according to claim 1 in which the resin is an emulsion prepared by emulsion polymerization of at least one α, β-monoethylenically unsaturated monomers in the presence of an emulsifier selected from a polyacrylic acid and a copolymer of acrylic acid and at least one monomer selected from the group consisting of methacrylic acid, acrylamide, methacrylamide and a hydrophilic monomer of the formula:

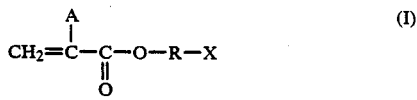

wherein A is hydrogen atom or methyl; R is a substituted or unsubstituted alkylene group having 2 to 4 carbon atoms and X is a functional group having at least one of oxygen atom, phosphorus atom and sulfur atom.